United States Patent
Spaether et al.

(10) Patent No.: US 7,329,626 B2
(45) Date of Patent: Feb. 12, 2008

(54) ZIEGLER-NATTA CATALYST, PREPARATION, AND USE FOR THE POLYMERIZATION OF ALKENES

(75) Inventors: Frank Wolf Spaether, Ratingen (DE); David Andrew Presken, Maineville, OH (US)

(73) Assignee: Lummus Novolen Technology GmbH, The Hague (NL)

( * ) Notice: Subject to any disclaimer, the term of this patent is extended or adjusted under 35 U.S.C. 154(b) by 397 days.

(21) Appl. No.: 10/935,211

(22) Filed: Sep. 7, 2004

(65) Prior Publication Data

US 2006/0052237 A1    Mar. 9, 2006

(51) Int. Cl.
*B01J 37/00* (2006.01)
*C08F 4/02* (2006.01)

(52) U.S. Cl. ............ 502/115; 502/103; 502/127; 502/80; 502/84; 502/125; 526/124.2; 526/124.3; 526/128; 526/142; 526/348

(58) Field of Classification Search ............ 502/103, 502/127, 80, 84, 115, 125; 526/124.2, 124.3, 526/128, 142, 348
See application file for complete search history.

(56) References Cited

U.S. PATENT DOCUMENTS

| 4,301,029 | A | | 11/1981 | Caunt et al. |
| 4,378,304 | A | * | 3/1983 | Dombro ............ 502/111 |
| 5,006,620 | A | | 4/1991 | Zolk et al. |
| 5,162,465 | A | | 11/1992 | Kerth et al. |
| 6,200,922 | B1 | | 3/2001 | Hüffer |
| 6,232,255 | B1 | * | 5/2001 | Winslow et al. ........ 502/103 |

2001/0012874 A1  8/2001  Huffer et al.

FOREIGN PATENT DOCUMENTS

| EP | 0 195 497 A2 | | 9/1986 |
| EP | 195497 A2 | * | 9/1986 |
| EP | 0 288 845 B1 | | 4/1991 |
| EP | 0 761 696 B1 | | 4/1998 |
| EP | 0 829 490 B1 | | 12/1999 |
| EP | 0 812 861 B1 | | 1/2001 |
| EP | 1 229 054 A1 | | 8/2002 |

* cited by examiner

*Primary Examiner*—Ling-Sui Choi
(74) *Attorney, Agent, or Firm*—Dilworth & Barrese, LLP

(57) ABSTRACT

A method for making a solid catalytic component for a Ziegler-Natta catalyst includes contacting a particulate porous support with a solution of a hydrocarbon soluble organomagnesium precursor compound in a hydrocarbon solvent; and reacting said hydrocarbon soluble organomagnesium precursor compound with an amount of aliphatic or aromatic alcohol, said amount being within an acceptable range of a molar equivalent of aliphatic or aromatic alcohol calculated according to formula (I):

$$Equ_{Alkanol} = 2 \cdot \frac{\left[ (\text{mmole MgR/g support}) - 2.1 - 0.55 \cdot \text{wt \% (H}_2\text{O)/support} \right]}{[\text{mmole MgR/g support}]} \quad (I)$$

wherein $Equ_{Alkanol}$=molar equivalents of aliphatic or aromatic alkanol relative to the molar amount of magnesium-organic precursor, (mmole MgR/g support)=mmoles of magnesium-organic precursor per gram of particulate solid support, wt % (H$_2$O)/support=weight percent of physically adsorbed water on the solid support, and said magnesium organic precursor compound being converted to a magnesium-oxygen compound.

35 Claims, No Drawings

ZIEGLER-NATTA CATALYST, PREPARATION, AND USE FOR THE POLYMERIZATION OF ALKENES

BACKGROUND

1. Field of the Invention

The present invention relates to a Ziegler-Natta catalyst, and particularly to a method for making the catalyst and a method for using the catalyst in a polymerization reaction.

2. Background of the Art

Ziegler-Natta catalysts are advantageously used in olefin polymerization reactions to produce stereoregulated linear polymers. Typically, such catalysts include a trialkyl aluminum (e.g., triethyl aluminum) in combination with a solid component which includes a transition metal compound such as titanium chloride as co-catalyst on a support including a magnesium halide, and Otypically a porous particulate support (e.g., silica, alumina, etc.), and optionally an internal electron donor. Generally, the Ziegler-Natta catalysts are small, solid particles, but soluble forms and supported catalysts have also been used.

Ziegler-Natta catalysts are especially useful for the homopolymerization and copolymerization ethylene, propylene, and other alk-1-enes to produce films, fibers and moldings.

U.S. Pat. Nos. 5,162,465 and 5,006,620 disclose the preparation of polymers of propene using a Ziegler-Natta catalyst system consisting of a titanium component which is based on a finely divided, shape-imparting silica gel and contains, in addition to titanium, magnesium, chlorine and a benzenecarboxylic acid derivative, an aluminum component and a silane component. Both patents have in common that the impregnation of the supporting particle is performed using magnesium organic precursor compounds. These compounds are, in general, air and moisture sensitive and require additional solvent addition to the catalyst preparation process. Secondly, the conversion of the magnesium organic precursor compound to the magnesium halide is conducted using halogenating agents like chlorine or hydrogen chloride, which are in general considered as hazardous and environmentally unfriendly compounds.

EP 288845 discloses a supported catalyst component comprising a magnesium halide and as support a particulate solid which solid is identified as silica gel and according to the preparation is derived from the reaction of said particulate support with a magnesium organic precursor compound. By using such a catalyst component it is possible to produce from alk-1-enes polymers having a good morphology and bulk density with a good catalytic efficiency.

EP-A 761696 relates to catalytic systems of the Ziegler-Natta type comprising as support particulate macroporous silica gels having a mean particle diameter of from 5 to 200 μm, which are formed from smaller sub-particles by spray-drying. Again, the precursor compound to the magnesium halide is taken from the class of organomagnesium compounds. The catalytic systems show a good productivity and stereospecifity in the polymerization of $C_2$-$C_{10}$ alk-1-enes.

EP 829490 B1 also describes a catalytic system of the Ziegler Natta-type where a particulate support is impregnated with a magnesium-organic compound and eventually converted to a magnesium compound containing halogen.

The above patents, which describe the prior art, have in common that the impregnation of the supporting particle is performed using magnesium organic precursor compounds. In particular EP 829490 B1 describes the conversion of supported organo-magnesium precursors to an intermediate containing magnesium-oxygen bonds. In subsequent steps the magnesium intermediate is converted to a halogen containing magnesium compound. However, the described procedure is rather unspecific with respect to the conversion step of the pre-cursor to the intermediate magnesium compound and yields catalysts with inferior performance, in particular the polymerization productivity.

It is therefore an object of the present invention to overcome the above-described limitations and to develop improved catalytic systems of the Ziegler-Natta-type, regarding the polymerization productivity. The resulting catalysts have a high activity and allow the production of polymers of α-alk-1-enes having a good morphology and bulk density.

SUMMARY

A method is provided herein for making a solid catalytic component for a Ziegler-Natta catalyst. The method comprises:

a) contacting a particulate porous support with a solution of a hydrocarbon soluble organomagnesium precursor compound in a hydrocarbon solvent;

b) reacting said hydrocarbon soluble organo-magnesium precursor compound with an amount of aliphatic or aromatic alcohol, said amount being at least about as much as, and not exceeding by more than about 15% of, a molar equivalent of aliphatic or aromatic alcohol $Equ_{Alkanol}$ calculated according to formula (I):

$$Equ_{Alkanol} = 2 \cdot \frac{\left[ (\text{mmole MgR/g support}) - 2.1 - 0.55 \cdot \text{wt \% (H}_2\text{O)/support} \right]}{[\text{mmole MgR/g support}]} \quad (I)$$

wherein $Equ_{Alkanol}$=molar equivalent of aliphatic or aromatic alkanol relative to the molar amount of magnesium-organic precursor (mmole MgR/g support)=mmoles of magnesium-organic precursor per gram of particulate solid support wt % ($H_2O$)/support=weight percent of physically adsorbed water on the solid support, and said magnesium organic precursor compound being converted to a magnesium-oxygen compound.

DETAILED DESCRIPTION OF PREFERRED EMBODIMENT(S)

The invention provides a solid catalytic component which can be used in combination with an aluminum compound as co-catalyst and optionally an external electron donor as additional co-catalyst (also called 'stereomodifier') to form a catalytic system of the Ziegler-Natta type, which solid catalytic component comprises a titanium or vanadium compound, a compound of magnesium containing at least one halogen, a particulate porous support, and optionally an internal electron donor. The solid catalytic component is prepared by contacting the particulate porous support with a hydrocarbon-soluble organomagnesium precursor compound in a hydrocarbon solvent and subsequently converting the organomagnesium precursor to an oxygen containing magnesium intermediate. Thereafter, the intermediate magnesium-oxygen compound is converted into a compound of magnesium containing at least one halogen.

We unexpectedly found that the stoichiometry of the conversion step from the magnesium organic precursor compound to the magnesium-oxygen intermediate compound is not fixed but has to be adjusted very specifically to the reaction parameters, i.e., the molar ratios of the support to the magnesium-organic pre-cursor and the level of physically adsorbed water on the support as well as the available hydroxyl moieties on the support surface. Deviations from the optimal stoichiometry yield inferior catalysts with respect to polymerization activity and polymer morphology in a non-linear manner. In this respect, non-linear refers to sudden (unexpected, non-extrapolate able) significant changes in the catalyst performance caused by subtle changes in the stoichiometry of the reactants.

Particulate Solid Support

According to the invention in the preparation of the catalytic system a particulate porous support is used. The support may be any type of support commonly used in Ziegler-Natta type catalysts, which is compatible with the polymerization of alk-1-enes. The support should have the ability to chemically, physically or mechanically bind the magnesium compound containing at least one halogen.

A commonly used type of support of Ziegler-Natta catalysts are particulate inorganic oxides having a specific surface area in the range of from about 10 to about 1000 $m^2/g$, preferably of from about 50 to about 700 $m^2/g$, and more preferably from about 100 to about 600 $m^2/g$, wherein the specific surface area is determined in accordance with DIN 66131, and having a mean particle diameter in the range of from about 5 to about 200 μm, preferably from 10 to 100 μm, and more preferably from 10 to 60 μm. Mean particle diameter herein refers to the volume average mean (median value) of the particle size distribution as determined by Malvern Mastersizer Analysis (Fraunhofer laser light scattering) in accordance with ASTM Standard D 4464-00.

The particulate inorganic oxides used in the preparation of the solid catalytic component of the catalytic systems of the invention can be of a granular (irregular) or spray-dried (semi-spherical, micro-spheroidal) nature. Fumed silica can advantageously be used. The particles of fumed silica can be built up to larger aggregates in a subsequent wet-chemical treatment. Also, the particulate support can be any other particulate oxide derived from particle forming processes known in the literature As inorganic oxides mainly oxides of silicon, aluminum, titanium, zirconium, or a of metal from the main groups I or II of the Periodic Table, or mixtures of these oxides are contemplated. Examples of preferred oxides include aluminum oxide, aluminum phosphate, magnesium oxide or layered silicates. Particularly preferred is the use of silicon oxide (silica gel). Also mixed oxides, such as aluminum silicates, or magnesium silicates, may be used.

The particulate inorganic oxides used as support in the catalytic component of the invention in general have pore volumes of from 0.1 to 10 $cm^3/g$, preferably from 1.0 to 4.0 $cm^3/g$, these values being determined by mercury porosimetry in accordance with DIN 66133 and nitrogen adsorption in accordance with DIN 66131.

The pH value (i.e., the negative logarithm of the $H^+$ ion concentration) of the particulate inorganic oxides used in the preparation of the solid catalytic component of the catalytic systems of the invention may vary depending on the production process used. Preferably, it is in the range of from about 3.0 to about 9.0, and more preferably from about 5.0 to about 7.0. The pH value is determined by using the method described in S. R. Morrison, *The Chemical Physics of Surfaces*, Plenum Press, New York [19771, ]pages 130 ff.

After their production the inorganic oxides often contain hydroxyl groups on their surfaces. By cleavage of water or condensation of Si—OH groups respectively, the hydroxyl group content may be reduced or even removed completely. This can be carried out by means of a thermal or chemical treatment. In general, a thermal treatment comprises heating the oxide at temperatures of from about 250° C. to about 900° C., preferably from about 600° C. to about 800° C., for a period of from about 1 to about 24 hours, preferably from about 2 to about 20 hours, and more preferably from about 3 to about 12 hours. Removal of the hydroxyl groups by chemical means may be carried out by treating the oxide with usual drying agents such as, for example $SiCl_4$, chlorosilanes and aluminum alkyls. Preferably, the inorganic oxides used contain normally from 0.1 to 5% by weight physically adsorbed water in addition to the water bonded in hydroxylic form. Usually the water content is determined by drying the inorganic oxide until constant weight at 160° C. and normal pressure. The loss of weight corresponds with the initial physically adsorbed water content.

The Compound of Titanium or Vanadium

The solid catalytic component further comprises a compound of titanium or vanadium.

Generally used titanium compounds include the halogenides of tri- or tetravalent titanium. Titanium alkoxy halogenide compounds and mixtures of two or more titanium compounds are also contemplated. Examples of suitable titanium compounds include $TiBr_3$, $TiBr_4$, $TiCl_3$, $TiCl_4$, $Ti(OCH_3)Cl_3$, $Ti(OC_2H_5)Cl_3$, $Ti(O\text{-}iso\text{-}C_3H_7)Cl_3$, $Ti(O\text{-}n\text{-}C_4H_9)Cl_3$, $Ti(OC_2H_5)Br_3$, $Ti(O\text{-}n\text{-}C_4H_9)Br_3$, $Ti(OCH_3)_2Cl_2$, $Ti(OC_2H_5)_2Cl_2$, $Ti(O\text{-}n\text{-}C_4H_9)_2Cl_2$, $Ti(OC_2H_5)_2Br_2$, $Ti(OCH_3)_3Cl$, $Ti(OC_2H_5)_3Cl$, $Ti(O\text{-}n\text{-}C_4H_9)_3Cl$, $Ti(OC_2H_5)_3Br$, $Ti(OCH_3)_4$, $Ti(OC_2H_5)_4$, or $Ti(O\text{-}n\text{-}C_4H_9)_4$. Preferably, the halogen component of the titanium compounds is chlorine. Also preferred are those titanium halogenides that, in addition to the titanium, contain only halogen. Of these the titanium chlorides, particularly titanium tetrachloride, are preferred.

Vanadium compounds that may be used in the preparation of the solid catalytic component of the catalytic system of the invention include the vanadium halogenides, the vanadium oxyhalogenides, the vanadium alkoxides and vanadium acetylacetonate. Preferred vanadium compounds are those having oxidation stages 3 to 5.

The Organomagnesium Compound

In the preparation of the solid catalytic component the particulate porous catalyst support is impregnated with at least one hydrocarbon soluble organomagnesium compound. Herein the term 'hydrocarbon soluble' means that the organomagnesium compound dissolves in an amount of at least 5% by weight at ambient temperature in an aliphatic or aromatic hydrocarbon solvent essentially comprising no co-solvents such as ethers. Organo-metallic compounds like tris(alkyl)aluminum might be added in order to increase the solubility of the organo-magnesium compound.

During the further course of the preparation of the solid catalytic compound the organomagnesium compound is converted into a compound of magnesium containing at least one halogen, by using known means, e.g., by contacting with a halogenating agent. Herein the term halogen refers to chlorine, bromine, iodine or fluorine or mixtures of two or more halogens. Preferably the compound of magnesium containing at least one halogen contains chlorine or bromine, and in particular chlorine.

Examples of suitable organomagnesium compounds include dialkyl, diaryl and alkylarylmagnesium compounds, magnesiumalkoxy or magnesiumaryloxy compounds or Grignard compounds.

Examples of suitable halogen-free magnesium compounds include dimethylmagnesium, diethylmagnesium, di-n-propylmagnesium, di-isopropylmagnesium, di-n-butylmagnesium, di-sec.-butylmagnesium, di-tert.-butylmagnesium, diamylmagnesium, n-butylethylmagnesium, n-butyl-sec.-butylmagnesium, n-butyloctylmagnesium, diphenylmagnesium, diethoxymagnesium, di-n-propyloxymagnesium, di-isopropyloxymagnesium, di-n-butyloxymagnesium, di-sec.-butyloxymagnesium, di-tert.-butyloxymagnesium, diamyloxymagnesium, n-butyloxyethoxymagnesium, n-butyloxy-sec.-butyloxymagnesium, n-butyloxyoctyloxymagnesium or diphenoxymagnesium.

Among these, diethylmagnesium, n-butylethylmagnesium and n-butyloctylmagnesium are preferred.

Examples of halogen containing Grignard compounds include n-butylmagnesium chloride, n-butylmagnesium bromide, sec.-butylmagnesium chloride, sec.-butylmagnesium bromide, tert.-butylmagnesium chloride, tert.-butylmagnesium bromide, amylmagnesium chloride, isoamylmagnesium chloride, hexylmagnesium chloride, octylmagnesium chloride, phenylmagnesium chloride, and phenylmagnesium bromide.

Particularly preferred magnesium compounds in the preparation of the solid catalytic component are magnesium di($C_1$-$C_{10}$alkyl) compounds.

The Internal Electron Donor Compound

In addition to the coordinating electron donor compound, which is contacted with the organomagnesium compound during the step of impregnating the support with the organomagnesium compound one or more so-called internal electron donor compounds may be used in the preparation of the solid catalytic component. Examples of suitable internal electron donor compounds include mono or polyfunctional carboxylic acids, carboxylic anhydrides, or carboxylic esters, and also ketones, ethers, alcohols, lactones or organophosphorus or organosilicon compounds.

Preferred internal donor compounds included carboxylic acid derivatives and in particular phthalic acid derivatives having the general formula:

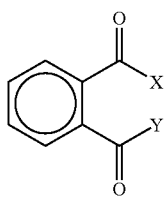

wherein X and Y each represent a chlorine or bromine atom or a $C_1$-$C_{10}$ alkoxygroup or X and Y taken together represent an oxygen atom forming an anhydride function. Particularly preferred internal electron donor compounds are phthalic esters of formula (I) wherein X and Y each are a $C_1$-$C_8$ alkoxy group, such as a methoxy, ethoxy, n-propyloxy, isopropyloxy, n-butyloxy, sec.-butyloxy, or tert.-butyloxy group. Examples of preferred phthalic esters include diethyl phthalate, di-n-butyl phthalate, di-isobutyl phthalate, di-n-pentyl phthalate, di-n-hexyl phthalate, di-n-heptyl phthalate, di-n-octyl phthalate or di-2-ethylhexyl phthalate.

Further examples of preferred internal electron donor compounds include diesters of 3- or 4-membered, optionally substituted cycloalkane 1,2-dicarboxylic acids, as well as monoesters of substituted benzophenone 2-carboxylic acids or substituted benzophenone 3-carboxylic acids. As hydroxy compounds in the esterfication reaction for synthesis of these esters usual alkanols such as $C_1$-$C_{15}$ or $C_5$-$C_7$ cycloalkanols, which alkanols optionally may be substituted with one or more $C_1$-$C_8$ alkyl groups, as well as $C_1$-$C_{10}$ phenols, are used.

A further group of suitable internal donor compounds are the non-substituted and substituted ($C_1$-$C_{10}$ alkyl)-1,3-propane diethers and derivatives of the group of succinates.

Also, mixtures of two or more internal electron donor compounds may be used in the preparation of the solid catalytic component of the invention.

When used in the preparation of the particulate solid component, the internal electron donor compound in general is used in an amount of from 0.05 to 2.0 moles, preferably 0.4 to 0.6 mole for each mole of the sum of the organomagnesium- and magnesium halide compound.

The Conversion Step from the Magnesium Organic Pre-Cursor to the Magnesium-Oxygen Intermediate The conversion of the organo-magnesium precursor compound to the magnesium-oxygen intermediate, in particular a magnesium-alkoxide can, amongst other routes, be achieved by the addition of an alkanol in a specific stoichiometric manner.

In general in the preparation of the solid catalytic component a $C_1$-$C_8$ alkanol, such as methanol, ethanol, n-propanol, isopropyl alcohol, n-butanol, sec.-butanol, tert.-butanol, isobutyl alcohol, n-hexanol, n-heptanol, n-octanol or 2-ethylhexanol, or mixtures of two or more of these alkanols, preferably ethanol, is used.

In accordance with the invention, the molar equivalents (with respect to the magnesium-organic precursor) of the alkanol has to be adjusted to quantitatively convert the magnesium-organic pre-cursor to the magnesium-oxygen intermediate. But there should not be significant excess of the required amount of the alkanol to quantitatively convert the magnesium-organic precursor. The optimal molar equivalents of the alkanol is calculated according to formula (I)

$$Equ_{Alkanol} = 2 \cdot \frac{\left[ (\text{mmole MgR/g support}) - 2.1 - \frac{}{0.55 \cdot \text{wt \% (H}_2\text{O)/support}} \right]}{[\text{mmole MgR/g support}]} \quad (I)$$

where $Equ_{Alkanol}$=molar equivalents of alkanol relative to the molar amount of magnesium-organic pre-cursor (mmole MgR/g support)=mmoles of magnesium-organic precursor per g of particulate solid support wt % ($H_2O$)/support=weight percent of physically adsorbed water on the solid support (vide infra)

The molar equivalent of alkanol used should be at least about as much as, and not exceeding by more than about 15%, the value of $Equ_{Alkanol}$ as determined by formula 1 above, preferably not exceeding by more than about 10%, and more preferably not exceeding by more than about 2%, the value of $Equ_{Alkanol}$ as determined by formula 1 above.

The Preparation of the Solid Catalytic Component

The solid catalytic component of the invention preferably is produced by using the following two-stage process:

In the first stage the particulate porous support, e.g. an inorganic oxide is suspended in an inert solvent, preferably a liquid alkane (e.g., hexane, heptane, octane, etc.) or aromatic hydrocarbon solvent (e.g., toluene or ethylbenzene), and the slurry formed is treated with a solution of the hydrocarbon soluble organomagnesium compound (in a hydrocarbon solvent such as heptane), and then the mixture formed is reacted at a temperature of from about 10° C. to about 120° C. for from about 0.5 to about 5 hours, normally under stirring. Next, a stoichiometric amount of a $C_1$-$C_8$ alkanol is added according to formula (1) at a temperature between about −20 and about 50° C. and preferably reacted for a period of about 60 min.

Next, a compound of titanium or vanadium, preferably a titanium compound, and optionally the internal electron donor compound are added, in an amount of from about 1 to about 15 moles, preferably from about 2 to about 10 moles of the titanium compound, and from about 0.01 to about 1 mole, preferably about 0.4 to about 0.6 mole of the internal electron donor compound for each mole of the combined magnesium compounds. The resulting mixture is allowed to react, in general under stirring, for at least about 30 minutes at a temperature in the range of from about 10° C. to 150° C., preferably from about 60° C. to about 130° C. The resulting solid product is then collected by filtration and washed with a $C_1$-$C_{10}$ alkylbenzene, preferably ethylbenzene.

In the second stage the solid product resulting from the first stage is extracted with an excess of titanium tetrachloride or an excess of a solution of titanium tetrachloride in an inert solvent, preferably a $C_7$-$C_{10}$ alkylbenzene, containing at least 5% by weight of titanium tetrachloride. In general the extraction is continued for at least about 30 minutes. Then the product is washed with a liquid alkane until the content of titanium tetrachloride in the washing liquid is less than 2% by weight.

The solid catalytic component preferably has a molar ratio of the inorganic oxide to the compound of titanium or vanadium in the range of from 1000 to 1, more preferably from 100 to 2, and in particular from 50 to 3.

An advantage of the solid catalytic component the invention is that the polymerization performance, in particular the catalyst productivity, is significantly increased over the art.

The Aluminum Compound Co-Catalyst

The catalytic systems of the invention in addition to the solid catalytic component further comprise an aluminum compound as co-catalyst.

Examples of suitable aluminum compounds include aluminum trialkyls and derivatives thereof wherein an alkyl group is substituted by an alkoxy group or a halogen atom, e.g. chlorine or bromine atom. The alkyl groups may be the same or different. The alkyl groups may be linear or branched chain alkyl groups. Preferred trialkylaluminum compounds are those wherein the alkyl groups each have 1 to 8 carbon atoms, such as trimethylaluminum, triethylaluminum, tri-isobutylaluminum, trioctylaluminum or methyldiethylaluminum.

The External Electron Donor Compound

In addition to the aluminum compound the catalytic system of the invention preferably comprises as further co-catalyst an external electron donor compound. Examples of external electron donor compounds which may be used in the catalytic system of the invention include mono- and polyfunctional carboxylic acids, carboxylic anhydrides and carboxylic esters, and ketones, ethers, alcohols, lactones as well as organic phosphorus and silicon compounds. Also, a mixture of two or more external electron donor compounds may be used. The external electron donor compound and the internal electron donor compound used in the preparation of the solid catalyst component a) may be the same or different. Preferred external electron donor compounds are the organosilicon compounds of general formula (II)

$$R^1_n Si(OR^2)_{4-n} \qquad (II)$$

wherein each of the $R^1$'s, which may be the same or different, represents a $C_1$-$C_{20}$ alkyl group, a 5- to 7-membered cyclic alkyl group optionally substituted with $C_1$-$C_{10}$ alkyl, a $C_6$-$C_{18}$ aryl group or a $C_6$-$C_{18}$ aryl-$C_1$-$C_{10}$ alkyl group, an $R^2$ may be the same or different and is a $C_1$-$C_{20}$ alkyl group and n is the integer 1, 2 or 3.

Preferred compounds of formula (II) are diisopropyldimethoxysilane, isobutylisopropyldimethoxysilane, diisobutyldimethoxysilane, dicyclopentyldimethoxysilane, cyclohexylmethyldimethoxysilane, dicyclohexyldimethoxysilane, isopropyl-tert.-butylidimethoxysilane, isopropyl-sec.-butylidimethoxysilane, and isobutyl-sec.-butylidimethoxysilane.

Preparation of the Catalytic System

To prepare the catalytic system of the invention the aluminum compound as co-catalyst and the external electron donor compound as additional co-catalyst may be contacted with the solid catalytic component separately in any order or mixed together, normally at a temperature in the range of from about 0° C. to 200° C., preferably from about 20° C. to about 90° C. and a pressure of from about 1 to about 100 bar, in particular from about 1 to about 40 bar.

Preferably, the aluminum compound co-catalyst is added in such an amount that the atomic ratio of the aluminum compound to the transition metal of the solid catalytic component is from about 10:1 to about 800:1, in particular from about 20:1 to about 200:1.

The catalytic systems of the invention may be advantageously used in the polymerization of alk-1-enes. Suitable alk-1-enes include linear or branched $C_2$-$C_{10}$ alkenes, in particular linear $C_2$-$C_{10}$ alk-1-enes such as ethylene, propylene, but-1-ene, pent-1-ene, hex-1-ene, hept-1-ene, oct-1-ene non-1-ene, dec-1-ene or 4-methylpent-1-ene. Mixtures of these alk-1-enes may be polymerized as well.

The catalytic systems of the invention comprising the solid catalytic components and as co-catalyst an aluminum compound or an aluminum compound and an external electron donor compound are excellent catalytic systems for use in the production of propylene polymers, both homopolymers of propylene as well as copolymers of propylene and one or more further alk-1-enes having up to 10 carbon atoms. The term copolymers as used herein also refers to copolymers wherein the further alk-1-ene having up to 10 carbon atoms is incorporated randomly. In these copolymers in general the comonomer content is less than about 15% by weight. The copolymers may also be in the form of so-called block or impact copolymers, which in general comprise at least a matrix of a propylene homopolymer or propylene random copolymer containing less than 15% by weight of a further alk-1-ene having up to 10 carbon atoms and a soft phase of a propylene copolymer containing 15% to 80% by weight of further alk-1-enes having up to 10 carbon atoms. Also, mixtures of comonomers are contemplated, resulting in, for example, terpolymers of propylene.

Polymerization

The production of the propylene polymers may be carried out in any common reactor suitable for the polymerization of alk-1-enes, either batchwise or, preferably, continuously, i.e., in solution (bulk phase), as suspension polymerization or as gas phase polymerization. Examples of suitable reactors include continuously operated stirred reactors, loop reactors, fluid bed reactors, or horizontal or vertical stirred powder bed reactors. It will be understood that the polymerization may be carried out in a series of consecutively coupled reactors. The reaction time depends on the chosen reaction conditions. In general, the reaction time is from about 0.2 to about 20 hours, usually from about 0.5 to about 10 hours.

In general the polymerization is carried out at a temperature in the range of from about 20° C. to about 150° C., preferably from about 50° C. to about 120° C., and more preferably from about 60° C. to about 90° C., and a pressure in the range of from about 1 to 100 bar, preferably from about 15 to about 40 bar, and more preferably from about 20 to about 35 bar.

The molecular weight of the resulting polymers may be controlled and adjusted over a wide range by adding polymer chain transfer or -termination inducing agents as commonly used in the art of polymerization, such as hydrogen. In addition an inert solvent, such as toluene or hexane, or an inert gas, such as nitrogen or argon, and smaller amounts of a powdered polymer, e.g., polypropylene powder may be added.

The (weight) average molecular weights of the propylene polymers produced by using the catalytic system of the invention in general are in the range of from about 10,000 to 1,000,000 g/mole and the melt flow rates are in the range of from about 0.1 to 100 g/10 min, preferably from about 0.5 to 50 g/10 min. The melt flow rate corresponds to the amount which is pressed within 10 minutes from a test instrument in accordance with ISO 1133 at a temperature of 230° C. and under a load of 2.16 kg. Certain applications might require different molecular weights than mentioned above and are contemplated to be included within the scope of the invention.

The catalytic systems of the invention enable to polymerize alk-1-enes producing polymers having a good morphology and a high bulk density when compared with the prior art catalytic systems. In addition the catalytic systems of the invention have an increased productivity.

Due to their good mechanical properties the polymers obtainable by using the catalytic system comprising the catalytic component solids of the invention, and in particular the propylene homopolymers or the copolymers of propylene with one or more further alk-1-enes having up to 10 C-atoms, can be used advantageously for the production of films, fibers or moldings and in particular for the production of films.

The solid catalytic components, catalytic systems and polymers obtained in the examples below were characterized by carrying out the following tests.

Measurement of the Mean Particle Diameter D:

To determine the mean particle diameter D of the particulate inorganic oxide the particle size distribution of the particles of the oxide was measured by laser light scattering (Malvern) analysis in accordance with ASTM Standard D 4464-00 and from the result the volume average (median value) particle diameter was calculated.

Measurement of the Particle Size Distribution of the Polymer Samples:

To determine the particle size distribution of the resulting polymer samples, the untreated autoclave polypropylene powder was measured by laser light scattering (Malvern) analysis in accordance with ASTM Standard D 4464-00 and from the result the volume average (median value) particle diameter was calculated.

Measurement of the Specific Surface Area

The specific surface area was measured by nitrogen adsorption in accordance with DIN 66131.

Measurement of the Pore Volume

The pore volume was measured by mercury porosimetry in accordance with DIN 66133.

Measurement of the RH Value

The pH value of the silica gel was measured by using the method described in S. R. Morrison, *The Chemical Physics of Surfaces*, Plenum Press, New York [1977], pages 130 ff.

Measurement of the Water Content

To determine the physically adsorbed water content 5 g silica gel was dried at 160° C. and normal pressure (constant weight). The loss of weight correspond to the initial physically bonded water content.

Measurement of the Catalyst Productivity

The catalyst productivity is defined as the amount of polymer in grams obtained per gram solid catalytic component used.

Measurement of Melt Flow Rate (MFR)

The MFR was measured in accordance with ISO-Norm 1133, at 230° C. and a load of 2.16 kg.

Measurement of the Isotacticity Index

The isotacticity index was measured in accordance with ISO Norm 1873-1: 1999.

The following Examples illustrate the invention. The Comparison Examples are provided for comparison purposes and do not exemplify the invention.

EXAMPLE 1

A spray dried silica gel ($SiO_2$) having a mean particle diameter D of 60 μm was used as the particulate porous support. The silica gel was further characterized by a specific surface area of 500 $m^2$/g, a pore volume of 1.6 $cm^3$/g, a pH-value of 6.5, and a water content of 2.5% by weight.

The silica gel was slurried in ethylbenzene and treated with a solution of n-butylethylmagnesium (in n-heptane), using for each mole of $SiO_2$ 0.5 mole of the organomagnesium magnesium compound. The solution was stirred at a temperature of 95° C. for 30 minutes and then cooled to 5° C., and then 1.3 molar equivalents, based on the organomagnesium compound, of ethanol was introduced. After the addition the reaction mixture is heated to 60° C. and subsequently cooled down to 10° C. At this temperature 4 molar equivalents, based on the organo-magnesium compound, of $TiCl_4$ are added followed by a heat up to 105° C. During the heat up 0.41 mole di-n-butyl phthalate per mole of magnesium-organic compound are added at 50° C. The stirring was continued for 1 hour at 105° C. and subsequently the solids formed were filtered off.

The obtained solid product was extracted with a 10% (vol) solution of titanium tetrachloride in ethylbenzene. Then the solid product was separated from the extraction agent and washed with n-heptane until the washings contained only 0.3% by weight of titanium tetrachloride.
The resulting solid catalytic component contained
4.2% by weight Ti
8.9% by weight Mg
33.6% by weight Cl.

COMPARATIVE EXAMPLE A

In this comparative example the procedure of Example 1 was repeated except that 2.5 molar equivalents, relative to the organo-magnesium compound, of ethanol were added. The molar ratio of silica support and magnesium was the same as in Example 1.
The resulting solid catalytic component contained
4.2% by weight Ti
8.7% by weight Mg
34.5% by weight Cl.

EXAMPLE 2

The procedure of Example 1 was repeated, except that the silica gel contained 3.0 wt % of physically adsorbed water. The amount of ethanol was changed to 1.1 equivalents according to formula (I). The molar ratio of silica support and magnesium was the same as in Example 1.
The resulting solid catalytic component contained
4.2% by weight Ti
8.4% by weight Mg
34.5% by weight Cl.

COMPARATIVE EXAMPLE B

In this comparative example the procedure of Example 2 was repeated except that the silica gel contained 2.0 wt % of physically adsorbed water. The amount of ethanol was not adjusted and remained at 1.1 equivalents. The molar ratio of silica support and the solid magnesium chloride was the same as in Example 1.
During the addition of the $TiCl_4$, a strong discoloration to black occurred, which indicated a reduction of the Ti(IV). The catalyst was rendered unusable and had to be discarded.

EXAMPLE 3

The procedure of Example 1 was repeated, except that the amount of organo-magnesium compound was used in a ratio of 0.33 mole per mole $SiO_2$. The amount of ethanol added was adjusted to 0.8 molar equivalents according to formula (I).

The resulting solid catalytic component contained
4.2% by weight Ti
9.9% by weight Mg
34.5% by weight Cl.

COMPARATIVE EXAMPLE C

In this comparative example the procedure of Example 3 was repeated except that an excess of ethanol (1.85 molar equivalents) was added The resulting solid catalytic component contained
4.2% by weight Ti
9.2% by weight Mg
34.5% by weight Cl.

Polymerizations

The solid catalytic components of Examples 1-3 as well as those of the Comparative Examples A-C were examined under the same conditions in polymerizations carried out as described below:

For bulk polymerization a 5 liter pressure autoclave was charged with 10 mmoles of triethylaluminum, 0.5 mmoles of cyclohexylmethyldimethoxysilane (each dissolved in 10 ml heptane) and 915 g of liquid propylene at ambient temperature under stirring. Subsequently the catalyst (25 mg in 10 ml of heptane) was flushed into the reactor with another portion of 915 g of liquid propylene. The reactor is heated to 70° C. within 10 min after which the catalyst is polymerized for another 60 minutes. The reaction was terminated by means of releasing the pressure and cooling down the reactor. The polypropylene homopolymer was recovered and the catalytic productivity (g polymer/g solid catalytic component) was determined gravimetrically. The melt flow rate and the isotacticity index, based on the xylene solubles, of the polymer in unaltered form were determined.

For gas phase polymerization the quantity of propylene charged to the reactor was reduced. First, 190 ml of propylene were added after the addition of hydrogen. A second 190 ml of propylene were added to the reactor to flush the alkyl and silne into the reactor. The reactor was then heated to 40° C. and the catalyst was charged to the reactor using a third aliquot of propylene, i.e., 190 ml. The reactor was then heated quickly to 75° C. and the reactor pressure maintained at 400 psig for 1 hour. After 1 hour the reactor pressure was reduced to atmospheric and the contents removed via the Strahman valve at the bottom of the reactor.

The properties of the propylene homopolymers obtained by using the polymerization procedure described above and using the solid catalytic components prepared in the Examples 1-3 and Comparative Examples A-C are presented in the following Table 1.

TABLE 1

| | Examples/Comparative examples | | | | | |
| --- | --- | --- | --- | --- | --- | --- |
| | 1 | 2 | 3 | A | B | C |
| Mole Ratio $SiO_2$/Mg | 2/1 | 2/1 | 3/1 | 2/1 | 2/1 | 3/1 |
| Equivalents of Ethanol | 1.3 | 1.1 | 1.85 | 2.5 | 1.1 | 1.85 |
| mmoles Mg/g $SiO_2$ | 8.32 | 8.32 | 5.49 | 8.32 | 8.32 | 5.49 |
| Wt % water adsorbed on support | 2.5% | 3.0% | 2.5% | 2.5% | 2.0% | 2.5% |
| Productivity (gas phase) | 26,300 | 25,300 | 17,200 | 18,630 | n.m. | 21,000 |
| MFR (gas phase) | 10 | 9.8 | 10 | 11.4 | n.m. | 9.6 |
| Productivity (bulk) | 39,000 | 36,800 | 25,000 | 28,000 | 0 | 21,000 |
| MFR (bulk) | 11.9 | 12.5 | 11.5 | 10.6 | n.m. | n.m. |
| Wt % Xylene solubles (gas) | 1.37 | 1.33 | 1.43 | 1.46 | n.m. | n.m. |
| Wt % Xylene solubles (bulk) | 1.63 | 1.69 | 1.67 | 1.34 | n.m | n.m | n.m. = not measured

Ziegler-Natta catalysts are the subject of continued improvements, because their properties such as activity/productivity, morphology, stereo specifity very strongly effect the polymerization process. During the preparation/manufacturing usually by-products are formed, which have to be washed out in order to render the catalyst highly active and highly stereo specific. It is therefore of interest to find stoichiometries, which yield the highest performance catalyst in combination with the lowest amount of unwanted by-products.

In this specific case this can be accomplished by carefully controlling the conversion of the magnesium-organic precursor to the magnesium-oxygen intermediate. Unexpectedly it turned out that if an excess of the conversion reagent (alkanol) is used, the polymerization performance of the respective catalysts are significantly inferior to the catalysts, where the exact stoichiometric amount of conversion reagent was used. The exact stoichiometric amount of the conversion reagent is influenced by the kind of the catalyst support, the amount physically adsorbed water and the ratio between the (inert) support and the active components; i.e. the magnesium compounds.

EXAMPLES 4-6 AND COMPARATIVE EXAMPLES D-H

In a typical lab scale experiment 10 g of silica gel obtained from W.R. Grace Co. Davison Division under the designation Silipol 2229 are slurried in 150 ml of ethylbenzene at ambient temperature followed by the addition of butylethylmagnesium (BEM, exothermic reaction to 39° C.) and subsequent heating for 30 min at 95° C. The mixture is cooled down to 5° C. At this temperature ethanol (dissolved in 40 ml of ethylbenzene) is added drop wise over a period of 20 minutes (further external cooling) with observation of an exothermic reaction and evolution of ethane and butane. During the addition the temperature of the solution should not exceed 10° C. The amount of ethanol (expressed in terms of molar equivalents with respect to magnesium) was calculated according to formula I, above. The amount of molar equivalent of ethanol actually used as compared to the ideal amount as calculated from formula 1 varied as follows:

| Example/Comp. Ex. | Equ$_{Ethanol}$ (Calc.) | Moles ethanol used | Deviation % (+/-) |
|---|---|---|---|
| 4 | 1.096 | 1.10 | 0.36% (+) |
| 5 | 1.23 | 1.25 | 1.62% (+) |
| 6 | 0.836 | 0.85 | 1.67% (+) |
| Comp. Ex. D | 1.096 | 2.50 | 128% (+) |
| Comp. Ex. E | 1.096 | 1.80 | 64.2% (+) |
| Comp. Ex. F | 1.096 | 1.30 | 18.6% (+) |
| Comp. Ex. G | 1.096 | 1.00 | 8.76% (−) |
| Comp. Ex. H | 0.636 | 1.85 | 191% (+) |

The colorless slurry is stirred for another 10 minutes at 10° C. and is subsequently heated up to 85° C. in a stepwise manner (20-40-85 C) and stirred for 30 min. at this temperature. The slurry is cooled down to 10° C. and treated (drop wise slow addition) with 6 molar equivalents of TiCl$_4$ not exceeding 20° C. A color change occurs from white over pale yellow to orange. The mixture is heated to 50° C. followed by the drop wise addition of 0.41 molar equivalents of di-alkylphthalate and further heating to 105° C. where it is kept under stirring and refluxing for 60 min. (including heat up approx. 90 min). Finally the orange slurry is transferred (80° C.) into the extraction frite, filtered from solvents and continuously extracted with a 1:9 mixture of TiCl$_4$ in ethylbenzene for 2.0 hrs at 125° C. jacket temperature. Afterwards the extraction solvent is filtered off and the catalyst is washed with three portions of heptane. The catalyst solid is dried in vacuum to yield a free flowing greenish beige powder. The productivity P in terms of gram polypropylene produced per gram of catalyst per hour was determined.

TABLE 2

| Example/Comp. Ex. | % Water in Support | Mg$_{(mmoles/g\ SiO2)}$ | Equivalents ethanol used | Productivity g$_{PP}$/g$_{CAT}$ |
|---|---|---|---|---|
| 4 | 3.0 | 8.3 | 1.10 | 36,000 |
| 5 | 2.0 | 8.3 | 1.25 | 40,000 |
| 6 | 2.0 | 5.5 | 0.85 | 28,000 |
| Comp. Ex. D | 3.0 | 8.3 | 2.50 | 27,500 |
| Comp. Ex. E | 3.0 | 8.3 | 1.80 | 31,500 |
| Comp. Ex. F | 3.0 | 8.3 | 1.30 | 35,000 |
| Comp. Ex. G | 3.0 | 8.3 | 1.00 | 5,000 |
| Comp. Ex. H | 3.0 | 5.5 | 1.85 | 19,500 |

The examples and comparative examples clearly indicate that the polymerization performance of the respective catalyst is highly dependent on the amount of ethanol, which has to be adapted to the loading (mmoles Mg/g SiO$_2$) and to the water content of the silica support. Deviations from this optimal ethanol amount result in inferior catalysts.

The prior art does not describe these dependencies (water and loading), nor the unexpected performance improvements approaching the ideal stoichiometries.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. A method for making a solid catalytic component for a Ziegler-Natta catalyst comprising:
   a) contacting a porous particulate support with a solution of a hydrocarbon soluble organomagnesium precursor compound in a hydrocarbon solvent;
   b) reacting said hydrocarbon soluble organomagnesium precursor compound with an amount of aliphatic or aromatic alcohol, said amount being at least about as much as, and not exceeding by more than about 15% of, a molar equivalent of aliphatic or aromatic alcohol Equ$_{Alkanol}$ calculated according to formula (I):

$$Equ_{Alkanol} = 2 \cdot \frac{\left[ (\text{mmole MgR/g support}) - 2.1 - 0.55 \cdot \text{wt \% (H}_2\text{O)/support} \right]}{[\text{mmole MgR/g support}]} \quad (I)$$

wherein
Equ$_{Alkanol}$=molar equivalent of aliphatic or aromatic alcohol relative to the molar amount of magnesium-organic precursor
(mmole MgR/g support)=mmoles of organgomagnesium precursor compound per gram of particulate solid support
wt % (H$_2$O)/support=weight percent of physically adsorbed water on the solid support, and said organomagnesium precursor compound being converted to a magnesium-oxygen compound; and c) combining a transition metal compound with the porous particulate support and magnesium-oxygen compound to form a reaction mixture.

2. The method of claim 1 wherein the porous particulate support is an inorganic oxygen compound selected from the group consisting of silicon oxide, aluminum oxide, magnesium oxide, titanium oxide, zirconium oxide, aluminum phosphate, aluminum silicate and magnesium silicate.

3. The method of claim 1 wherein the porous particulate support has a specific surface area of from about 10 $m^2$/g to about 1,000 $m^2$/g.

4. The method of claim 1 wherein the porous particulate support has a specific surface area of from about 50 $m^2$/g to about 700 $m^2$/g.

5. The method of claim 1 wherein the porous particulate support has a specific surface area of from about 100 $m^2$/g to about 600 $m^2$/g.

6. The method of claim 1 wherein the porous particulate support has a mean particle size of from about 5 μm to about 200 μm.

7. The method of claim 1 wherein the porous particulate support has a mean particle size of from about 10 μm to about 100 μm.

8. The method of claim 1 wherein the porous particulate support has a mean particle size of from about 15 μm to about 60 μm.

9. The method of claim 1 wherein the hydrocarbon solvent is an aromatic or aliphatic hydrocarbon selected from hexane, heptane, octane, toluene and ethylbenzene.

10. The method of claim 1 wherein the organomagnesium precursor compound includes dialkyl, diaryl or alkylarylmagnesium compounds, magnesiumalkoxy or magnesiumaryloxy compounds or Grignard compounds.

11. The method of claim 1 wherein the organomagnesium precursor compound includes one or more compounds selected from the group consisting of dimethylmagnesium, diethylmagnesium, di-n-propylmagnesium, di-isopropylmagnesium, di-n-butylmagnesium, di-sec.-butylmagnesium, di-tert.-butylmagnesium, diamylmagnesium, n-butylethylmagnesium, n-butyl-sec.-butylmagnesium, n-butyloctylmagnesium, diphenylmagnesium, diethoxymagnesium, di-n-propyloxymagnesium, di-isopropyloxymagnesium, di-n-butyloxymagnesium, di-sec.-butyloxymagnesium, di-tert.-butyloxymagnesium, diamyloxymagnesium, n-butyloxyethoxymagnesium, nbutyloxy-sec.-butyloxymagnesium, n-butyloxyoctyloxymagnesium and diphenoxymagnesium.

12. The method of claim 1 wherein the organomagnesium precursor compound includes one or more compounds selected from the group consisting of diethylmagnesium, n-butylethylmagnesium and n-butyloctylmagnesium.

13. The method of claim 1 wherein the organomagnesium precursor compound includes one or more compounds selected from the group consisting of n-butylmagnesium chloride, n-butylmagnesium bromide, sec.-butylmagnesium chloride, sec.-butylmagnesium bromide, tert.-butylmagnesium chloride, tert.-butylmagnesium bromide, amylmagnesium chloride, isoamylmagnesium chloride, hexylmagnesium chloride, octylmagnesium chloride, phenylmagnesium chloride and phenylmagnesium bromide.

14. The method of claim 1 wherein the organomagnesium precursor compound is a magnesium di($C_1$-$C_{10}$ alkyl) compound.

15. The method of claim 1 wherein the aliphatic alcohol is selected from the group consisting of methanol, ethanol, n-propanol, isopropyl alcohol, n-butanol, sec.-butanol, tert.-butanol, isobutyl alcohol, n-hexanol, n-heptanol, n-octanol or 2-ethylhexanol and mixtures thereof.

16. The method of claim 1 wherein the amount of alcohol does not exceed by more than about 10% the value of $Equ_{Alkanol}$ as calculated from formula I.

17. The method of claim 1 wherein the amount of alcohol does not exceed by more than about 2% the value of $Equ_{Alkanol}$ as calculated from formula I.

18. The method of claim 1 wherein the transition metal compound is a compound of titanium or vanadium.

19. The method of claim 1 wherein the transition metal compound is a titanium compound is selected from the group consisting of $TiBr_3$, $TiBr_4$, $TiCl_3$, $TiCl_4$, $Ti(OCH_3)Cl_3$, $Ti(OC_2H_5)Cl_3$, $Ti(O\text{-iso-}C_3H_7)Cl_3$, $Ti(O\text{-n-}C_4H_9)Cl_{13}$, $Ti(OC_2H_5)Br_3$, $Ti(O\text{-n-}C_4H_9)Br_3$, $Ti(OCH_3)_2Cl_2$, $Ti(OC_2H_5)_2Cl_2$, $Ti(O\text{-n-}C_4H_9)_2Cl_2$, $Ti(OC_2H_5)_2Br_2$, $Ti(OCH_3)_3Cl$, $Ti(OC_2H_5)_3Cl$, $Ti(O\text{-n-}C_4H_9)_3Cl$, $Ti(OC_2H_5)_3Br$, $Ti(OCH_3)_4$, $Ti(OC_2H_5)_4$ and $Ti(O\text{-n-}C_4H_9)_4$.

20. The method of claim 1 wherein the transition metal compound is a vanadium compound selected from the group consisting of vanadium halogenide, vanadium oxyhalogenide, vanadium alkoxide and vanadium acetylacetonate.

21. The method of claim 1 wherein the molar ratio of the organomagnesium compound to the porous particulate support ranges from 0.1:1 to 1.0:1.

22. The method of claim 1 wherein the porous particulate support is suspended in an inert liquid medium to form a slurry to which a solution of the organomagnesiumprecursor compound in a hydrocarbon solvent is added.

23. The method of claim 1 further comprising the step of combining with the reaction mixture an internal electron donor compound.

24. The method of claim 23 wherein the internal electron donor compound is a phthalic acid derivative having the general formula:

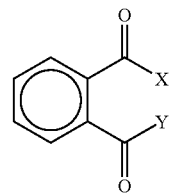

wherein X and Y each represent a chlorine or bromine atom or a $C_1$-$C_{10}$ alkoxygroup or X and Y taken together represent an oxygen atom forming an anhydride function.

25. The method of claim 24 wherein the internal electron donor compound is selected from phthalic esters wherein X and Y each are methoxy, ethoxy, n-propyloxy, isopropyloxy, n-butyloxy, sec.-butyloxy, or tert.-butyloxy groups.

26. The method of claim 24 wherein the phthalic esters are selected from the group consisting of diethyl phthalate, di-n-butyl phthalate, di-isobutyl phthalate, di-n-pentyl phthalate, di-n-hexyl phthalate, di-n-heptyl phthalate, di-n-octyl phthalate and di-2-ethylhexyl phthalate.

27. The method of claim 23 wherein the internal electron donor comprises one or more of diesters of 3- or 4-membered, substituted or unsubstituted cycloalkane 1,2-dicarboxylic acids, monoesters of substituted benzophenone 2-carboxylic acids or substituted benzophenone 3-carboxylic acids.

28. The method of claim 1 further comprising the step of extracting the solid catalytic component from the reaction mixture with a solution of titanium tetrachloride in an inert solvent and recovering the solid catalytic component.

29. The method of claim 28 further comprising the step of combining the solid catalytic component with an aluminum compound co-catalyst to provide a Ziegler-Natta catalyst.

30. The method of claim 29 wherein the aluminum compound is a trialkyl aluminum compound wherein the alkyl groups can be the same or different and each has from 1 to about 8 carbon atoms.

31. The method of claim 29 wherein the trialkyl aluminum compound comprises one or more compounds selected from the group consisting of trimethylaluminum, triethylaluminum, tri-isobutylaluminum, trioctylaluminum and methyldiethylaluminum.

32. The method of claim 29 further comprising the step of combining an external electron donor with the solid catalytic component.

33. The method of claim 32 wherein the external electron donor comprises one or more compound selected from the group consisting of mono- and polyfunctional carboxylic acids, carboxylic anhydrides, carboxylic esters, ketones, ethers, alcohols, lactones, organic phosphorus and silicon compounds.

34. The method of claim 32 wherein the external electron donor comprises organosilicon compounds of general formula:

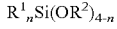

wherein each of the $R^1$'s, which may be the same or different, represents a $C_1$-$C_{20}$ alkyl group, a 5- to 7- membered cyclic alkyl group optionally substituted with $C_1$-$C_{10}$ alkyl, a $C_6$-$C_{18}$ aryl group or a $C_6$-$C_{18}$ aryl- $C_1$-$C_{10}$ alkyl group, each R2 may be the same or different and is a $C_1$-$C_{20}$ alkyl group, and n is the integer 1, 2 or 3.

35. The method of claim 34 wherein the external electron donor comprises one or more compound selected from the group consisting of diisopropyldimethoxysilane, isobutylisopropyldimethoxysilane, diisobutyldimethoxysilane, dicyclopentyldimethoxysilane, cyclohexylmethyldimethoxysilane, dicyclohexyldimethoxysilane, isopropyl-tert.-butylidimethoxysilane, isopropyl-sec.-butylidimethoxysilane and isobutyl-sec.-butylidimethoxysilane.

* * * * *